Jan. 30, 1940.   W. A. KROPP   2,188,600
DUPLICATING APPARATUS
Filed Aug. 22, 1938   10 Sheets-Sheet 1

Fig.1

Inventor:
Willis A. Kropp,
By:
Zabel, Carlson Fitzhugh & Wells
Attorneys Jan. 30, 1940.  W. A. KROPP  2,188,600
DUPLICATING APPARATUS
Filed Aug. 22, 1938   10 Sheets-Sheet 3

Inventor:
Willis A. Kropp.
By Zabel, Carlson, Fitzbaugh & Wells
Attorneys.

Jan. 30, 1940.                    W. A. KROPP                    2,188,600
                            DUPLICATING APPARATUS
                         Filed Aug. 22, 1938          10 Sheets-Sheet 6

Inventor:
Willis A. Kropp,
By: Zabel, Carlson, Fitzbaugh & Wells
Attorneys

Jan. 30, 1940.  W. A. KROPP  2,188,600
DUPLICATING APPARATUS
Filed Aug. 22, 1938  10 Sheets-Sheet 6

Jan. 30, 1940. W. A. KROPP 2,188,600
DUPLICATING APPARATUS
Filed Aug. 22, 1938 10 Sheets-Sheet 10

Inventor:
Willis A. Kropp,
By Zabel, Carlson, Gritzbaugh & Wells,
Attorneys

Patented Jan. 30, 1940

2,188,600

UNITED STATES PATENT OFFICE 2,188,600

DUPLICATING MACHINE

Willis A. Kropp, Oak Park, Ill., assignor to Ditto, Incorporated, Chicago, Ill., a corporation of West Virginia Application August 22, 1938, Serial No. 226,080

15 Claims. (Cl. 101—132)

This invention relates to duplicating apparatus of the type in which the reading matter or other design to be duplicated is carried in reverse on a gelatin band mounted about a drum to which copy sheets are fed one at a time and pressed by an impression roller or platen into operative face engagement with the band as the drum rotates for printing such copy sheets, and it is the object of the invention to provide an improved form and arrangement of parts by which improved results may be attained.

The invention is directed particularly to the means for feeding the sheets one at a time to the duplicating drum, to the means by which the copy sheet is brought into proper adjusted position with respect to the design on the gelatin band for providing the desired margins on the printed sheet, and to the means by which the printed sheets are stripped from the gelatin band. It has been among the objects of the invention to provide an improved arrangement by which the stripper mechanism can be thrown out of position so as to provide for a sheet to pass a plurality of times between the drum and the platen, and to provide improved means for supporting the platen in operative position and alternatively for moving the platen out of operative position with respect to the drum.

It is another object of this invention to improve apparatus of this type in sundry details hereinafter pointed out. The preferred means by which the several objects have been accomplished are illustrated in the accompanying drawings, in which—

Fig. 3 is an enlarged detailed view of certain of the parts as shown in Fig. 1.

Referring now to the several figures of the drawings, in which corresponding parts are indicated by the same reference characters, 30 indicates a frame which in the arrangement shown comprises standards 31 and 32 oppositely arranged (see Fig. 2) supporting a drum 33 by means of two short aligned shafts 34 and 35. The drum 33 is segmental in form as is usual in connection with gelatin-process duplicating machines, being provided with suitable mounting means of any approved type, as is indicated diagrammatically in Fig. 1, for mounting a gelatin band 36 about the face portion of the drum, the drum at the leading and rear edges of the face portion being provided with rollers 37 for engaging the gelatin band (see Figs. 1, 11 and 14). The arrangement is such that the gelatin band 36 can be shifted as desired circumferentially of the segmental face portion of the drum.

Figure 2:
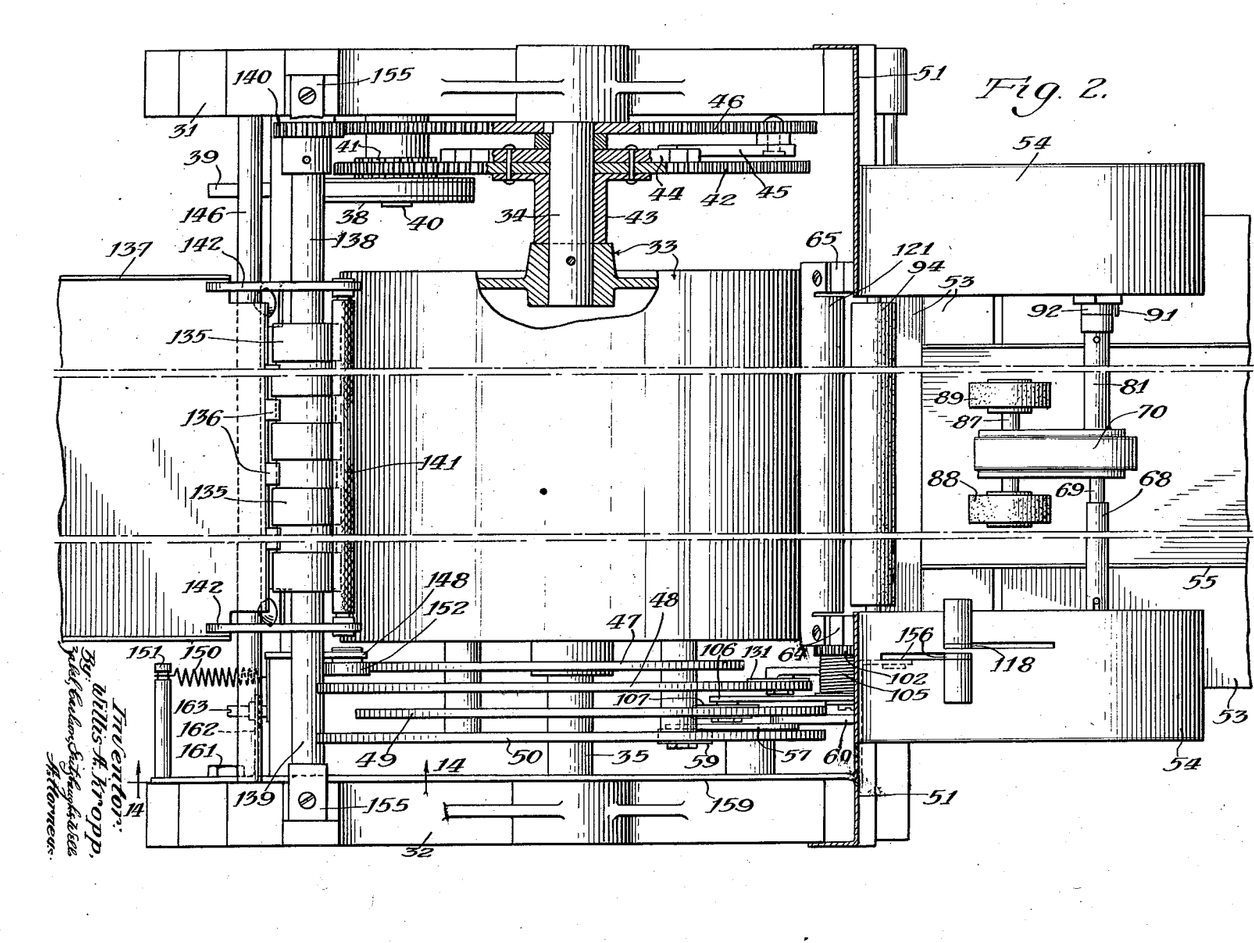
Fig. 2 is a top plan view of the parts shown in Fig. 1, but with certain of the parts partially broken away so as to be shown in horizontal section.

Means is provided for driving the drum 33, as is best shown in Fig. 2, comprising a drive pulley 38 connected by means of a belt 39 with any suitable source of power, said pulley 38 being rotatably mounted upon the standard 31 of the frame by means of a short stub shaft 40. The pulley 38 is provided at one side face with a pinion 41 rigidly connected therewith in position to mesh with a large gear 42 rotatably mounted upon the short shaft 34 by means of a collar 43. The gear 42 in turn is provided on its outer face portion with a ratchet wheel 44 which is adapted to be engaged by a pawl 45 pivotally mounted upon the adjacent face of a large gear 46 fixedly mounted upon the shaft 34 so as to rotate with the drum 33. No means is shown in the drawings for controlling the position of the pawl 45 by which power may be transmitted from the gear 42 to the gear 46. Control means of any approved type is to be employed as is well understood in the art for regulating the position of the pawl 45 in accordance with the requirements. Such control means are not shown since they form no part of the present invention.

Figure 1:
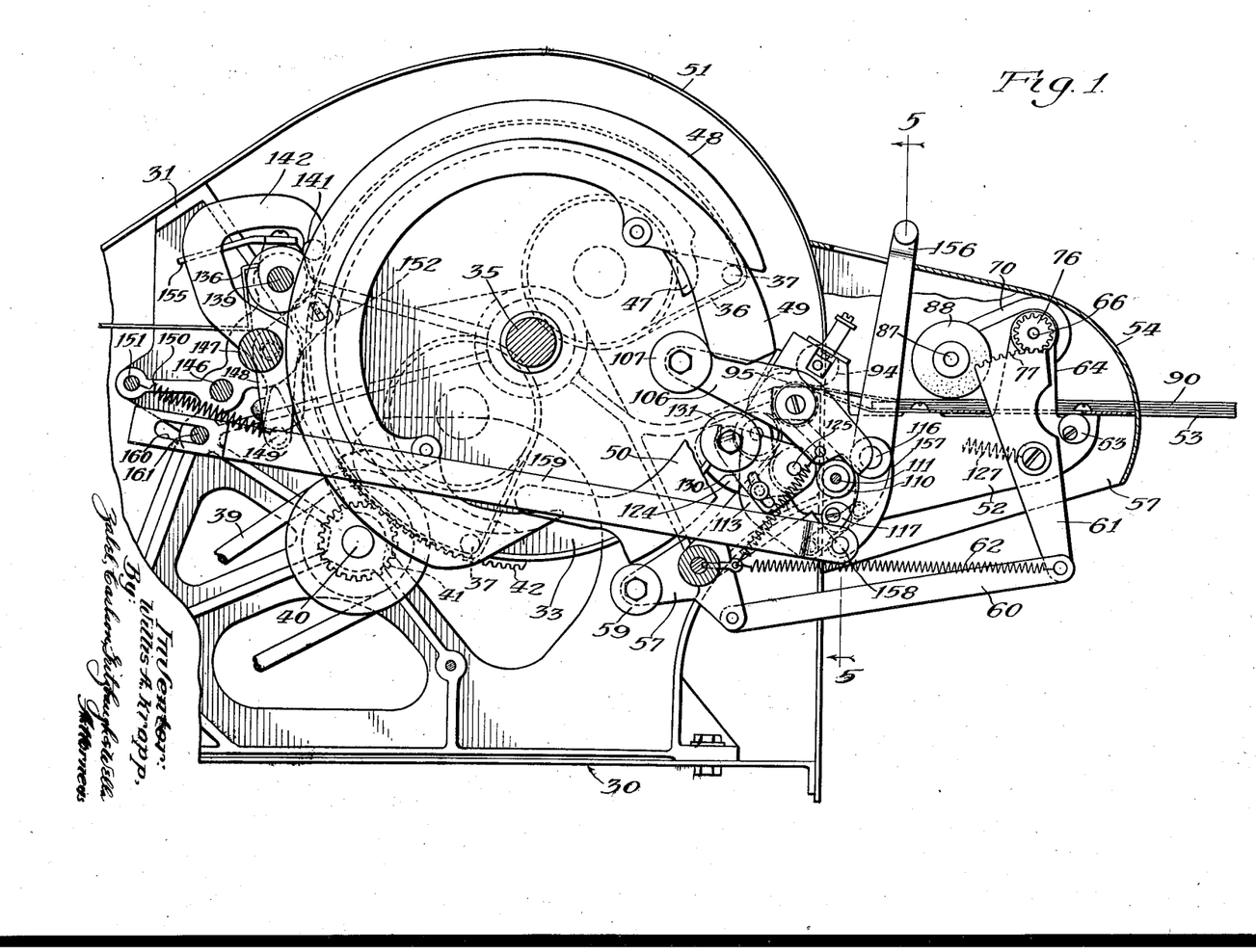
Fig. 1 is a side face view of the improved machine, but with the end portions broken away.

Upon the opposite end of the drum from that at which the gear 46 is mounted thereon, I have provided four cams 47, 48, 49 and 50, rigidly mounted upon the drum so as to rotate therewith for purposes as hereinafter described. Over the operating parts at opposite ends of the drum 33, I have provided sheet metal housings 51 of any approved type, as is best shown in Figs. 1 and 2.

Figure 5:
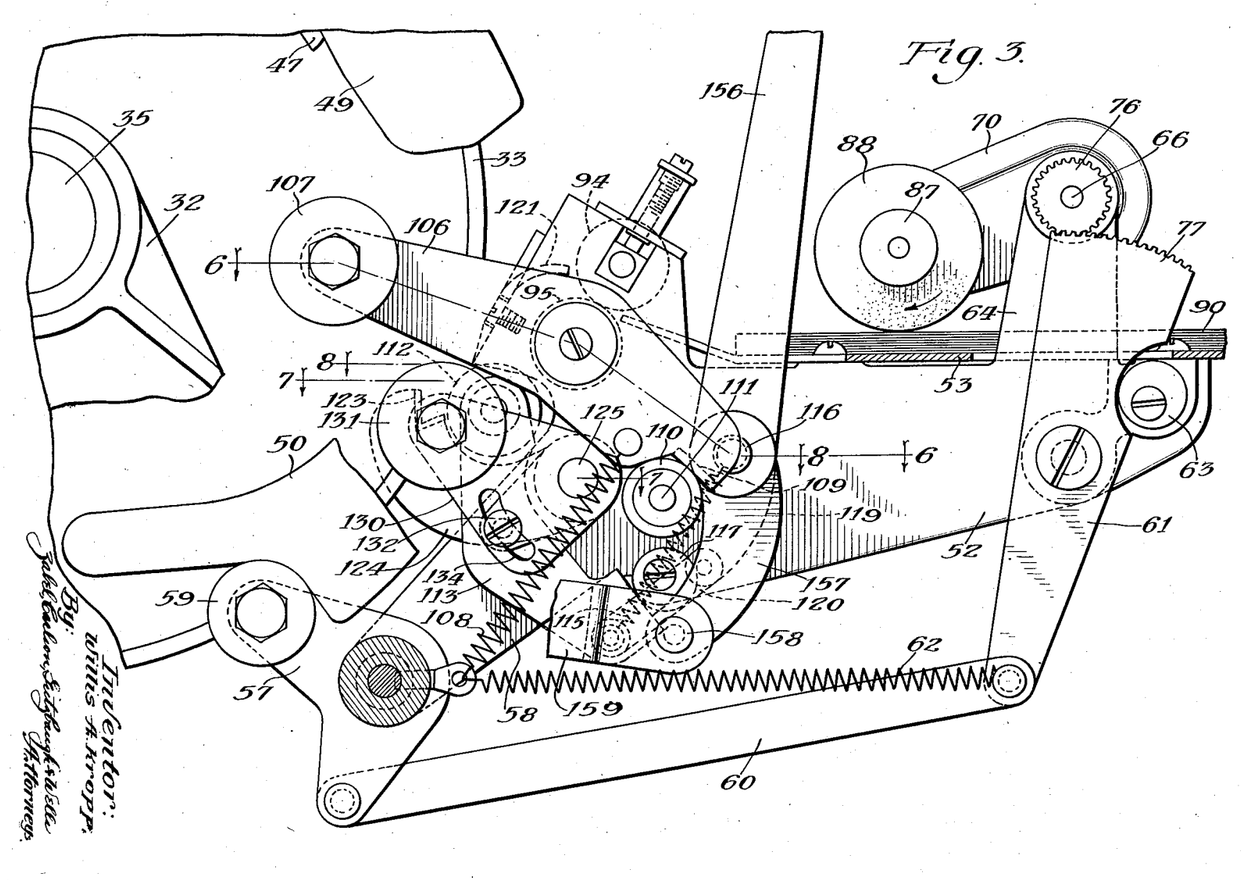
Fig. 5 is a vertical sectional view taken substantially at the line 5—5 of Fig. 1.

At the rear end of the machine (at the right in Fig. 1), I have provided extending frame bars 52 connected with the framework 30 for supporting a table 53 thereon, together with means for feeding the topmost sheet from a pile of copy sheets resting on the table. At opposite sides of the table, operating mechanism is provided in connection with the feed of the sheets from the table, and for covering such operating mechanism in part I have provided sheet metal housings 54 at opposite sides of the machine, as is best shown in Figs. 1 and 2. As is clearly shown in Fig. 5, the table 53 is preferably provided with adjustable side margin bars 55 at opposite sides of the table for holding the sheets in evenly piled relation to each other. In the arrangement shown, the margin bars 55 are held in frictional engagement with the table 53 by means of coiled springs 56, the arrangement being such that the margin bars are readily movable inwardly and outwardly with respect to each other to correspond with the width of the sheets being used.

The means for feeding to the drum the topmost sheet from a pile of sheets supported by the table 53 comprises means intermittently driven in timed relation to the rotation of the drum 33. This means comprises a bellcrank lever 57 pivotally mounted upon the end of an arm 58 extending forwardly and downwardly from one of the frame extension members 52 (see Fig. 3), such bellcrank lever having a roller 59 rotatably mounted upon one of its arms in position to be engaged by the cam 50 at a predetermined point in each rotation of the drum 33. The downwardly extending arm of the bellcrank lever 57 is connected by means of a link 60 with the lower end of an arm 61 which is pivotally mounted upon the frame member 52 at one side of the table 53. The arrangement is such that as the drum 33 rotates in clockwise direction from the position as shown in Fig. 3 the roller 59 and the bellcrank lever 57 are displaced in counterclockwise direction in said Fig. 3 for swinging the arm 61 also in counterclockwise direction in said figure. A coiled spring 62 connected between the movably mounted arm 61 and the lower end portion of the frame arm 58 serves to swing the movably mounted arm 61 in clockwise direction as soon as the cam 50 has cleared the roller 59 for permitting such result. An eccentric stop device 63 is adjustably mounted upon the frame member 52 in position to engage the edge of the arm 61 for limiting the movement of said arm in clockwise direction in said Fig. 3.

At opposite sides of the table 53, I have provided frame arms 64 rising from the frame members 52 respectively for supporting a drive shaft in position across the table in upwardly spaced relation thereto. In the arrangement shown, the drive shaft is built up from a plurality of parts, comprising a short shaft section 66 which is journaled in the upper end of one of the frame arms 64, and a long sleeve member 68 removably mounted at one end on said shaft section 66 so as to rotate therewith. At its inner end, the sleeve member 68 is slidably mounted upon a shaft section 69 which in turn is rotatably mounted in the side wall of a housing 70 as hereinafter described, the sleeve member 68 and the shaft section 69 being connected so as to rotate together. By this arrangement, the shaft 69 is caused normally to rotate with the shaft section 66, but the two shafts are adapted very quickly and easily to be disconnected from each other by a sliding movement of the tubular member 68 toward the housing.

The means for driving the shaft comprising the sections 66 and 69 includes a pinion 76 operatively mounted on the shaft section 66 so as to drive said shaft section in one direction but to rotate free of the shaft in the opposite direction, said pinion 76 being in mesh with gear teeth 77 on the upper end of the pivotally mounted arm 61. The arrangement is such that upon a stroke of the arm 61 in counterclockwise direction in Fig. 3 the shaft is driven in clockwise direction.

The means for supporting the housing 70 in position comprises a sleeve 81 rigidly connected at its inner end with one side wall of the housing 70 in axial alignment with the shaft section 69. At its opposite end, the sleeve 81 has a releasable connection with the upper end portion of the adjacent frame arm 64. The arrangement of the shaft comprising the sections 66 and 69 and the connections of said shaft as above described with the housing 70 and sleeve 81 are such as to hold the parts strongly in operative position during the operation of the machine. When the operator desires, however, the shaft and connected parts can be very quickly and easily removed from position. For accomplishing this purpose, the sleeve 68 is first moved toward the housing 70 for disengagement from the shaft section 66, and the whole assembly is then moved toward the left for freeing the sleeve 81 from the frame.

Within the housing 70, in the arrangement shown, I have provided driving connections between the shaft section 69 and a short shaft 87 which extends through the side walls of the housing 70 and has rollers 88 and 89 fixedly mounted upon its outer end portions. The arrangement is such that when the shaft sections 66 and 69 are driven in clockwise direction in Fig. 3 by reason of an operative stroke of the arm 61 in counterclockwise direction, the rollers 88 and 89 are likewise driven in clockwise direction in said Fig. 3 for moving the topmost sheet of a pile of sheets 90 toward the left. Upon the return movement of the arm 61 by the spring 62, the free-wheeling connection as above described permits the rotation of the pinion 76 with respect to the shaft section 66 so as not to change the position of the rollers 88 and 89.

Figures 11, 12, 13:
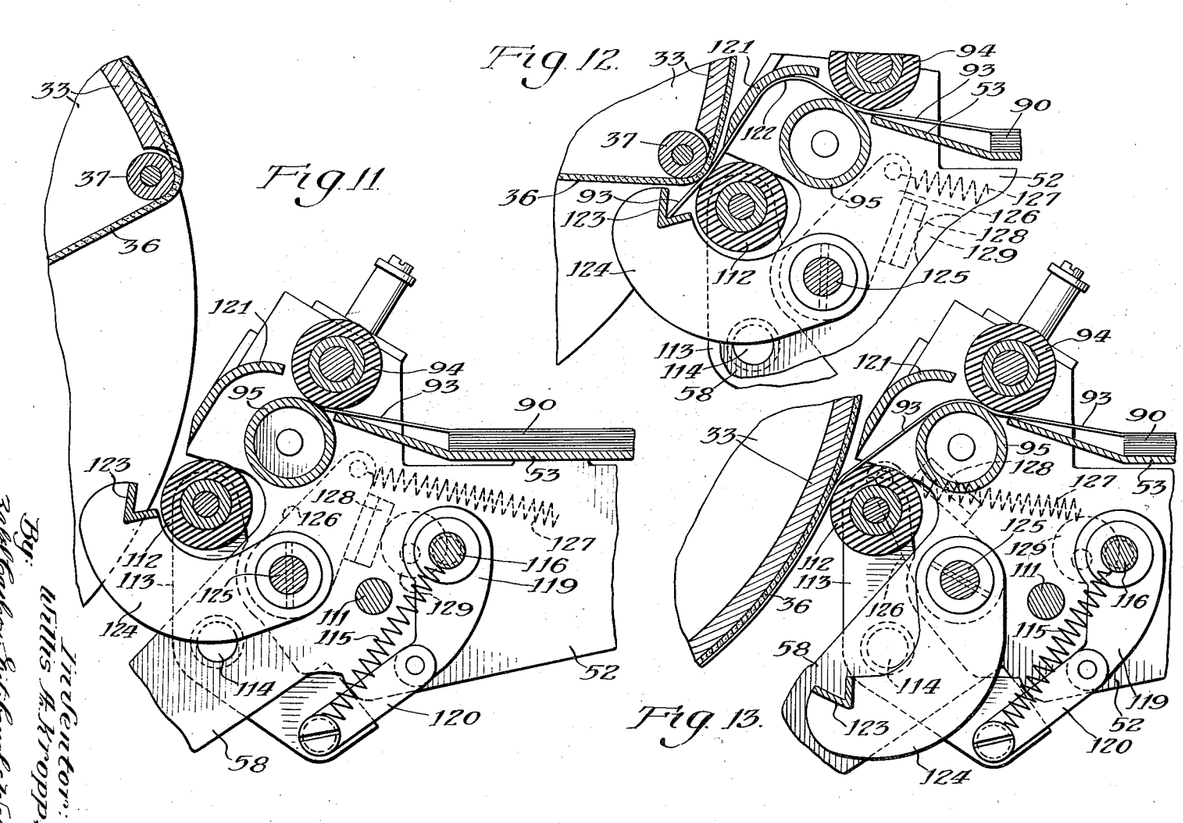
Fig. 11 is a vertical sectional view taken at the line 11—11 of Fig. 5.
Figs. 12 and 13 are views similar to Fig. 11 but showing changed positions of the parts.

In the arrangement as above described, the housing 70 serves as an arm for spacing the rollers 88 and 89 from the shaft section 69, such arm extending across above the table in spaced relation to the table, the rollers 88 and 89 being held by their own weight in operative engagement with the pile of sheets 90. In case the operator should desire to move the rollers 88 and 89 out of engagement with the pile of sheets, this can be accomplished by merely swinging the housing 70 and its connected parts about the shaft section 69 and the sleeve 81 so as to carry the rollers 88 and 89 upwardly and backwardly past the axis of the shaft section 66. Stop derock shaft 125 extending across the machine. The rock shaft 125 is provided with an arm 126 (see Figs. 11 and 12) which is connected by a spring 127 with the framework underneath the table 53, as is best shown in Fig. 1, such spring serving normally to hold the stop device in raised position adjacent to the platen roller 112 as shown in Figs. 11 and 12. For limiting the upward movement of the stop device 123, I have provided a bumper 128, preferably in the form of a block of rubber, carried by the arm 126 in position to engage an eccentric 129 adjustably mounted in position upon one of the frame members 52, as is best shown in Figs. 11 and 13.

Figure 4:
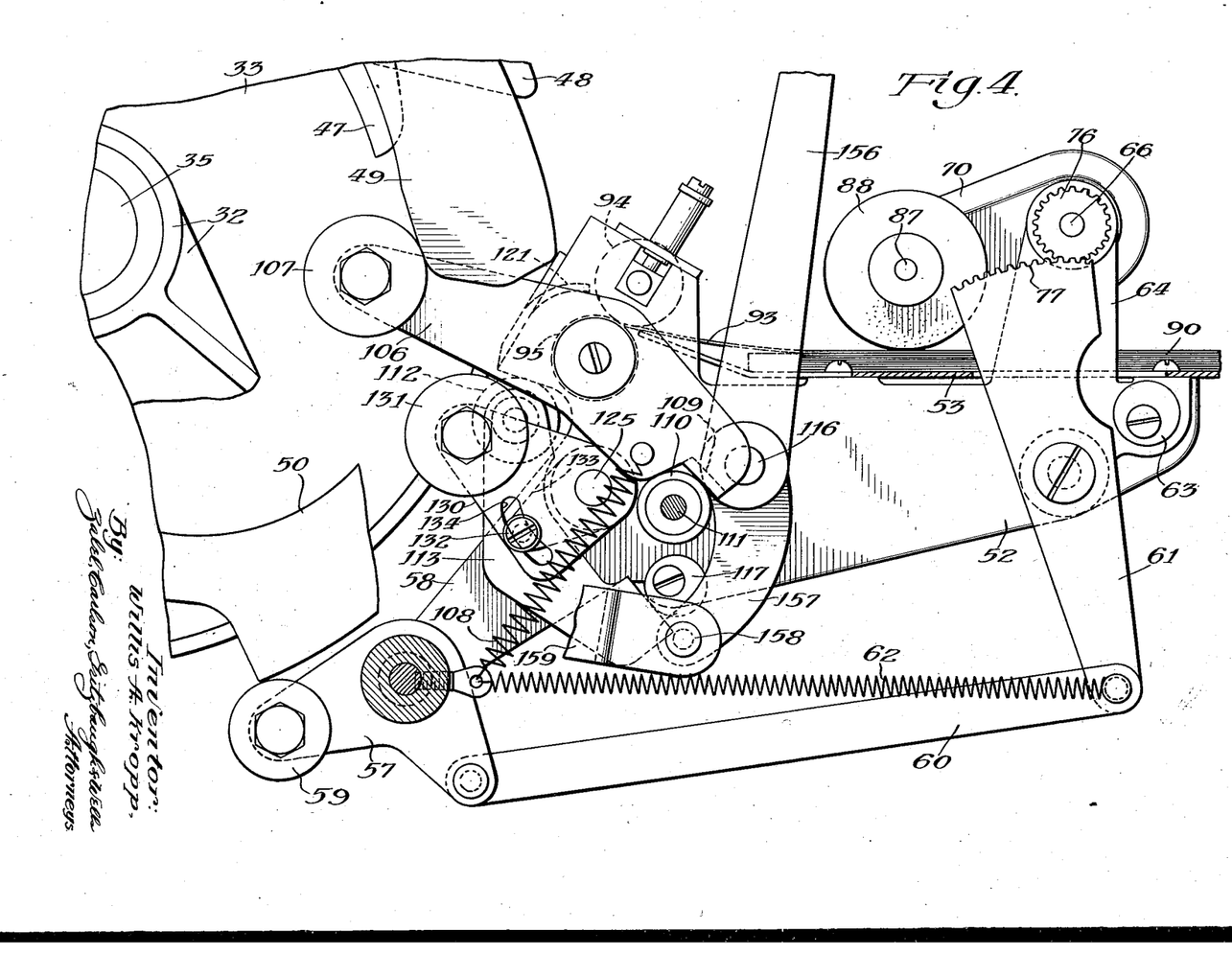
Fig. 4 is a view similar to Fig. 3 but showing a changed position of some of the parts.
Figure 7:
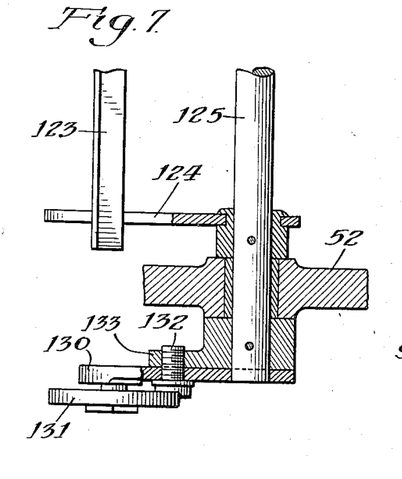

For moving the stop device 123 out of its raised position as shown in Fig. 11 to its lowered position as shown in Fig. 13, in timed relation to the movement of the drum, I have provided an arm 130 adjustably mounted in position upon the rock shaft 125 (see Fig. 7), such arm being provided upon its free end with a roller 131 in position to engage the cam 48 as the drum rotates. As is best shown in Figs. 4 and 7, the arm 130 is adjustable with respect to the shaft 125 by means of a screw 132 carried by a short arm 133 fixedly mounted upon the shaft 125, the screw 132 being positioned within a circular slot 134 formed in the arm 130. Upon loosening the screw 132, the arm 130 can be moved to the desired angular position with respect to the arm 133, the screw 132 when tightened being adapted to hold the arms in adjusted position. By an adjustment of the arm 130 with respect to the short arm 133, the position of the roller 131 with respect to the margin bar 123 is varied. The adjustment is preferably to be such that the margin bar shall be held in operative position as shown in Fig. 12 until the roller 37 and the gelatin band 36 are brought into close proximity to the margin bar. The roller 131 and cam 48 are then to operate in accurately timed relation for displacing the margin bar 123 ahead of the roller 37 so as to prevent the gelatin band from being brought into engagement with the margin bar.

When the drum 33 reaches the position as shown in Fig. 12, with a copy sheet 93 in position as shown in said figure, the gelatin band 36 is brought into operative engagement with the copy sheet so as to cause the sheet to adhere to the band. Upon the continued rotation of the drum, the copy sheet 93 bonded to the gelatin band is caused to advance with the band. At the initial contact of the band 36 with the copy sheet as shown in Fig. 12, the zone of engagement between the two is quite limited and the effectiveness of the hold on the sheet is correspondingly small. As the drum advances, however, from the position as shown in Fig. 12, the loop in the sheet 93 at 122 is eliminated so as to straighten out the sheet into the condition as shown in Fig. 13. By the time when the looped portion has been straightened, the zone of engagement of the sheet 93 and the gelatin band 36 has been very considerably increased with a corresponding increase in the strength of the hold on the sheet so as to enable the band to draw the sheet forward without danger of tearing the sheet or of destroying the bond between the sheet and the band.

As has been described above, the rollers 88 and 89 are adapted to give the sheet 93 its initial forward movement, serving to carry the sheet into the bite of the rollers 94 and 95. The sheet remains then in this position until the rollers 94 and 95 are actuated for drawing the sheet forward independently of the rollers 88 and 89, such rollers 88 and 89 being adapted to rotate independently of their normal drive so as not to interfere with the forward movement of the sheet which is carried by the rollers 94 and 95 into engagement with the platen roller 112 and the stop device 123. The sheet 93 is again brought to rest momentarily in the position of the sheet as shown in Fig. 12 until a bond is established between the copy sheet and the gelatin band 36 as above described, whereupon the sheet is drawn forward by the drum, with both the rollers 94 and 95 and the rollers 88 and 89 being driven by the sheet instead of serving to drive the sheet.

Figure 14:
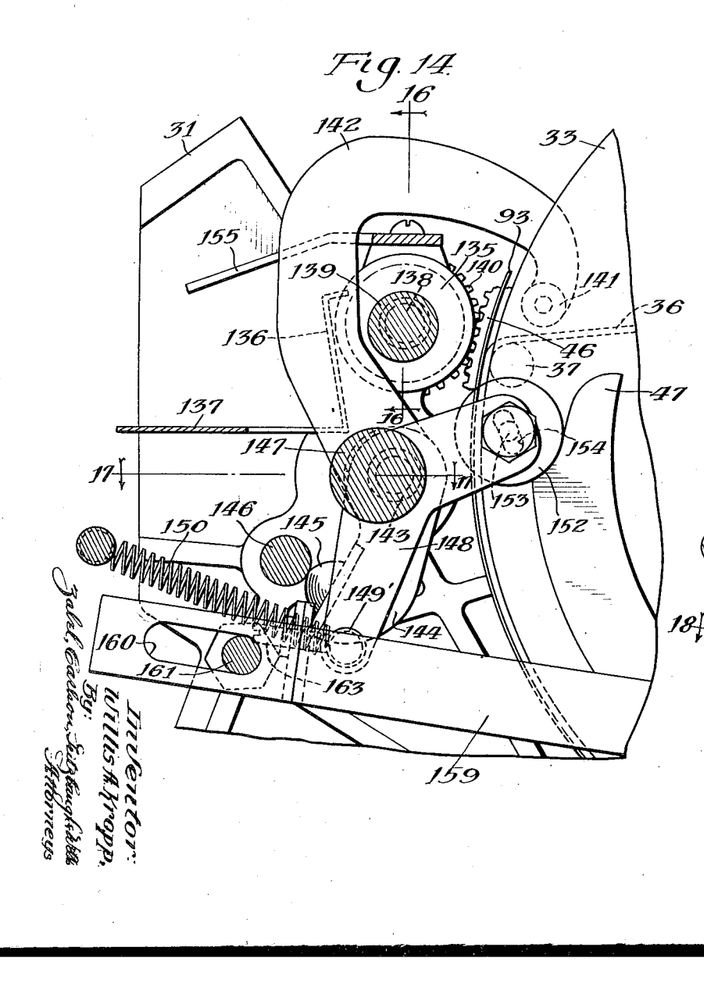
Fig. 14 is a vertical sectional view taken at the line 14—14 of Fig. 2.

The means for stripping the copy sheets from engagement with the gelatin band comprises a roller 135 mounted between the frame members 31 and 32 in slightly spaced relation to the drum as is clearly shown in Fig. 14. The roller 135 is preferably cut away at portions of its face so as to provide a plurality of spaced sections (see Fig. 16) for enabling guide fingers 136 forming part of a receiving tray 137 to have the desired effective cooperation with the roller. In the arrangement shown, the roller 135 is mounted in position by means of a shaft 138 which is adjustably mounted in position within eccentric bearing blocks 139 carried by the frame members 31 and 32. By an adjustment of the eccentric members 139, the spacing between the roller and the drum can be regulated, as will be readily understood. The roller 135 is continuously driven during the operation of the machine by means of a pinion 140 fixedly mounted upon the shaft 138 in position to mesh with the large gear 46, as is clearly shown in Fig. 2.

Figure 15:
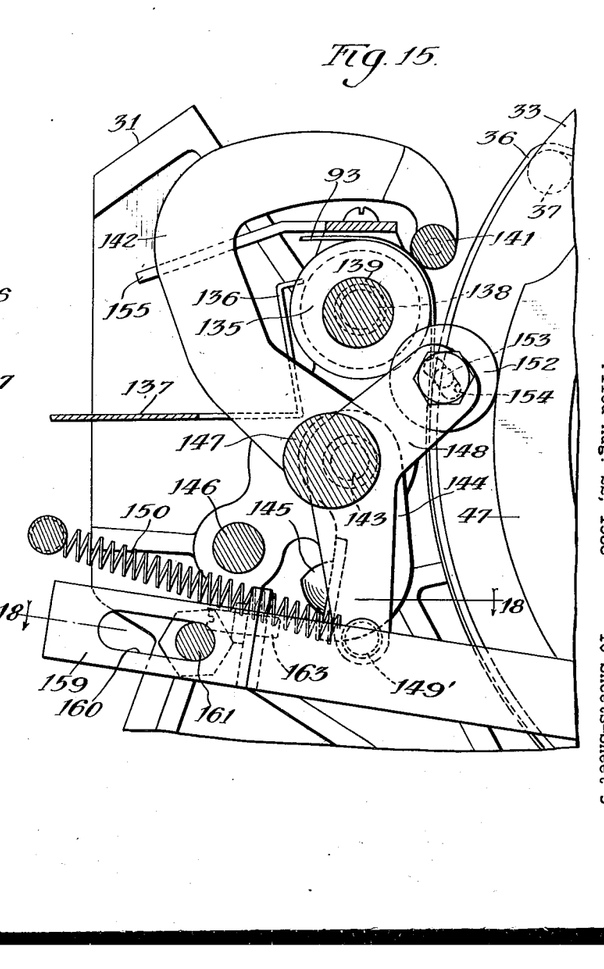
Fig. 15 is a view similar to Fig. 14 but showing the parts held by a cam in changed operative position.

For cooperation with the stripper roll 135, I have provided a stripper bar 141 extending longitudinally of the drum adjacent to the roller 135, as is best shown in Figs. 2 and 15. The bar 141 is preferably in the form of a roller rotatably mounted between arms 142 which are fixedly mounted upon a rock shaft 143 (see Fig. 17). Said arms 142 are mounted in position upon the rock shaft 143 by means of blocks 144 which extend downwardly in the form of arms below the rock shaft, being provided with bumper members 145, preferably of rubber, on their front faces in position to engage a tie-rod 146 for limiting the movement of the stripper bar 141 toward the drum. As is clearly shown in Fig. 17, the rock shaft 143 is rotatably mounted in position by means of eccentric bearing blocks 147 which are adjustably mounted in the frame members 31 and 32.

Figures 16, 17, 18:
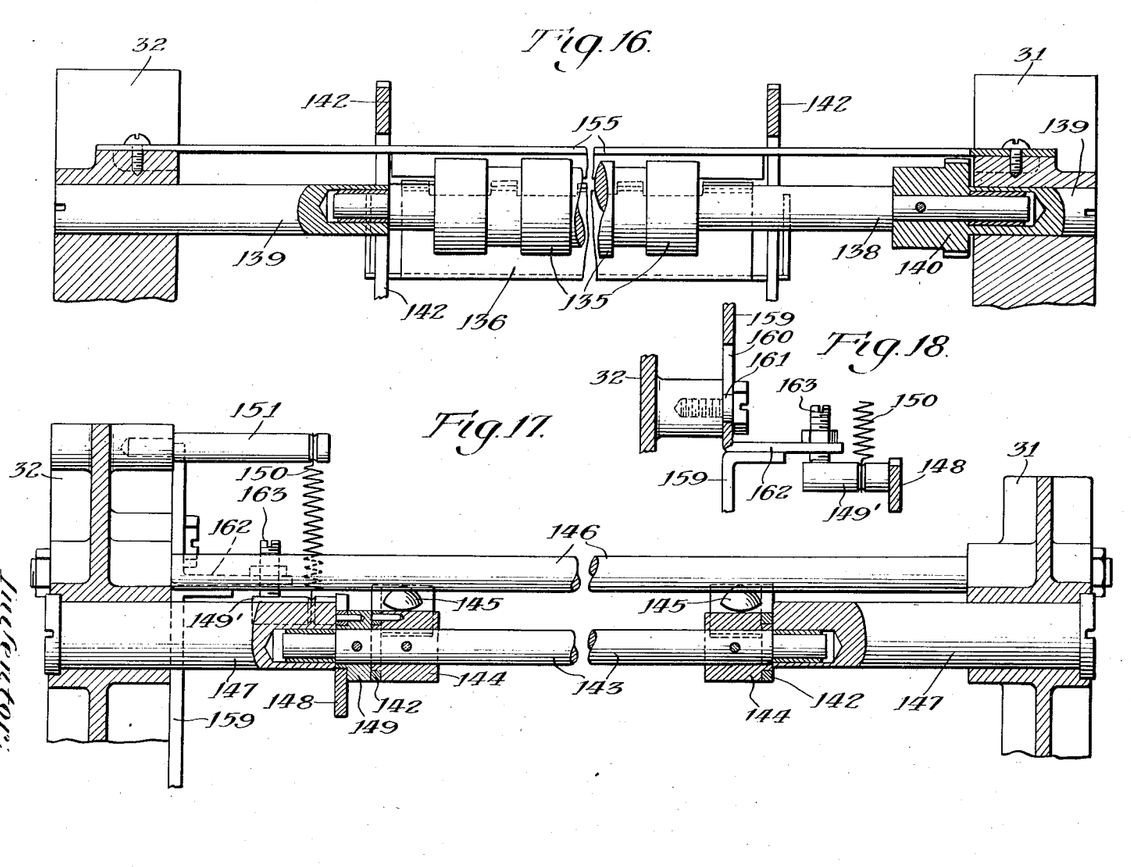
Fig. 16 is a vertical sectional view taken at the line 16—16 of Fig. 14.
Fig. 17 is a horizontal sectional view taken at the line 17—17 of Fig. 14.
Fig. 18 is a horizontal sectional view taken at the line 18—18 of Fig. 15.

As is also clearly shown in said Fig. 17, a bellcrank lever 148 is fixedly mounted upon the rock shaft 143, being mounted in position upon the rock shaft through the medium of a block 149. The downwardly extending arm of the bellcrank lever 148 is provided with a pin 149' extending from its face, such pin having a spring 150 connected therewith for holding the bellcrank lever normally turned to the limit of its motion in clockwise direction in Fig. 14, the spring 150 being connected at its opposite end with the frame member 32 by means of a pin 151, as is best shown in Fig. 2. The other arm of the bellcrank lever 148 extends toward the drum, being provided at its end portion with a cam roller 152 in position to engage the cam 47 at timed intervals in the rotation of the drum.

vices are provided for holding the parts in such changed position, comprising a pin 91 in fixed position on the frame arm 64 and a lug 92 which is mounted rigidly in position with respect to the sleeve.

In Fig. 3 the roller 59 is shown in engagement with the cam 50 just ready for its operative stroke for forwarding the topmost sheet of the pile 90 toward the left in said figure. In Figure 4, in which the parts are shown in the changed position which they assume upon a very slight advance movement of the drum from the position as shown in Fig. 3, the bell-crank lever 57 has been completely displaced for moving a sheet 93 from the pile 90 so as to bring its leading edge into the bite of two forwarding rollers 94 and 95 which are rotatably mounted upon the frame members 52 just in front of the table 53.

Figure 6:
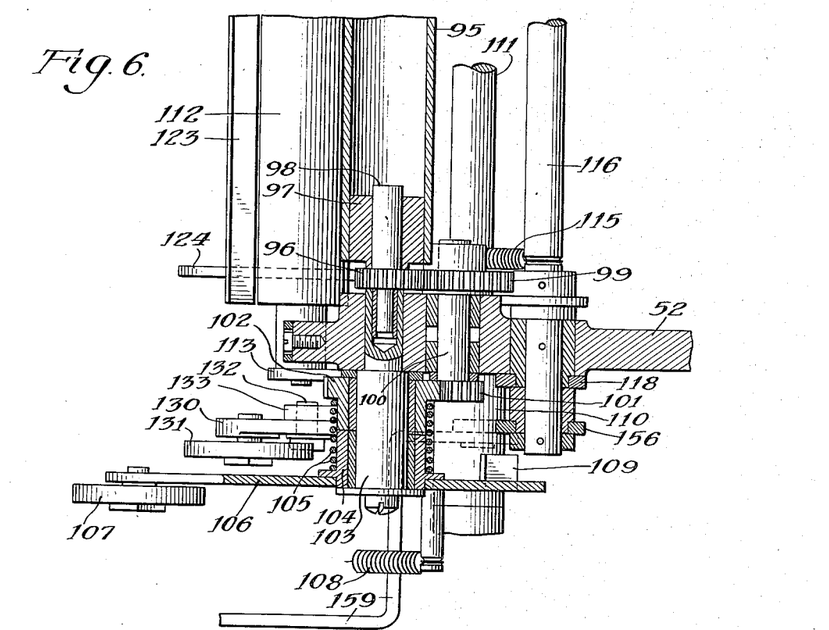
Figs. 6, 7, and 8 are horizontal sectional views taken substantially at the line 6—6, the line 7—7, and the line 8—8, respectively, of Fig. 3.

The rollers 94 and 95 are mounted in cooperative relation to each other for forwarding a sheet between them, the roller 95 being driven in the construction illustrated and the roller 94 being driven by frictional engagement with the roller 95 or with the interposed sheet. The means for rotating the feed roller 95 (see Fig. 6) comprises a pinion 96 fixedly connected with the roller by means of a head 97 and a pin 98, such pinion 96 being in operative engagement with a gear 99 fixedly mounted upon a short shaft 100 which in turn is rotatably mounted in the framework. At its outer end, the shaft 100 is provided with a pinion 101 which meshes with a gear 102 rotatably mounted upon a stub shaft 103 carried by the framework. Upon the stub shaft 103 adjacent to the gear 102 there is mounted a sleeve 104 of substantially the same size as that of the hub of the gear 102, said sleeve 104 and the aligned hub having a coiled spring 105 mounted thereon in such relation as to be tightened upon the sleeve and the hub when the sleeve 104 is driven in counterclockwise direction in Fig. 3 so as to cause the gear 102 to rotate in that direction with the sleeve. The arrangement is such that when the sleeve 104 is rotated in clockwise direction in said Fig. 3 the spring is loosened so as not to apply power to the hub of the gear 102. As a result of this construction, when the sleeve 104 is rotated in counterclockwise direction in Fig. 4 the roller 95 is driven in the same direction so as to cooperate with the roller 94 for forwarding the sheet 93 toward the left.

For actuating the sleeve 104, an arm 106 is mounted thereon having a roller 107 rotatably mounted upon one end portion, such roller standing normally in the path of the cam 49. A spring 108 connected at one end with the arm 106 and at its opposite end with the frame arm 58 holds the arm 106 normally in the position as shown in Fig. 4, with a lug 109 on said arm standing in engagement with a bumper 110 preferably formed of rubber and supported by a tie-rod 111. As the drum 33 carries the cam 49 in clockwise direction from the position as shown in Fig. 4, the rollers 94 and 95 are given operative rotary movement for advancing the sheet 93 toward the left.

Figures 9, 10:
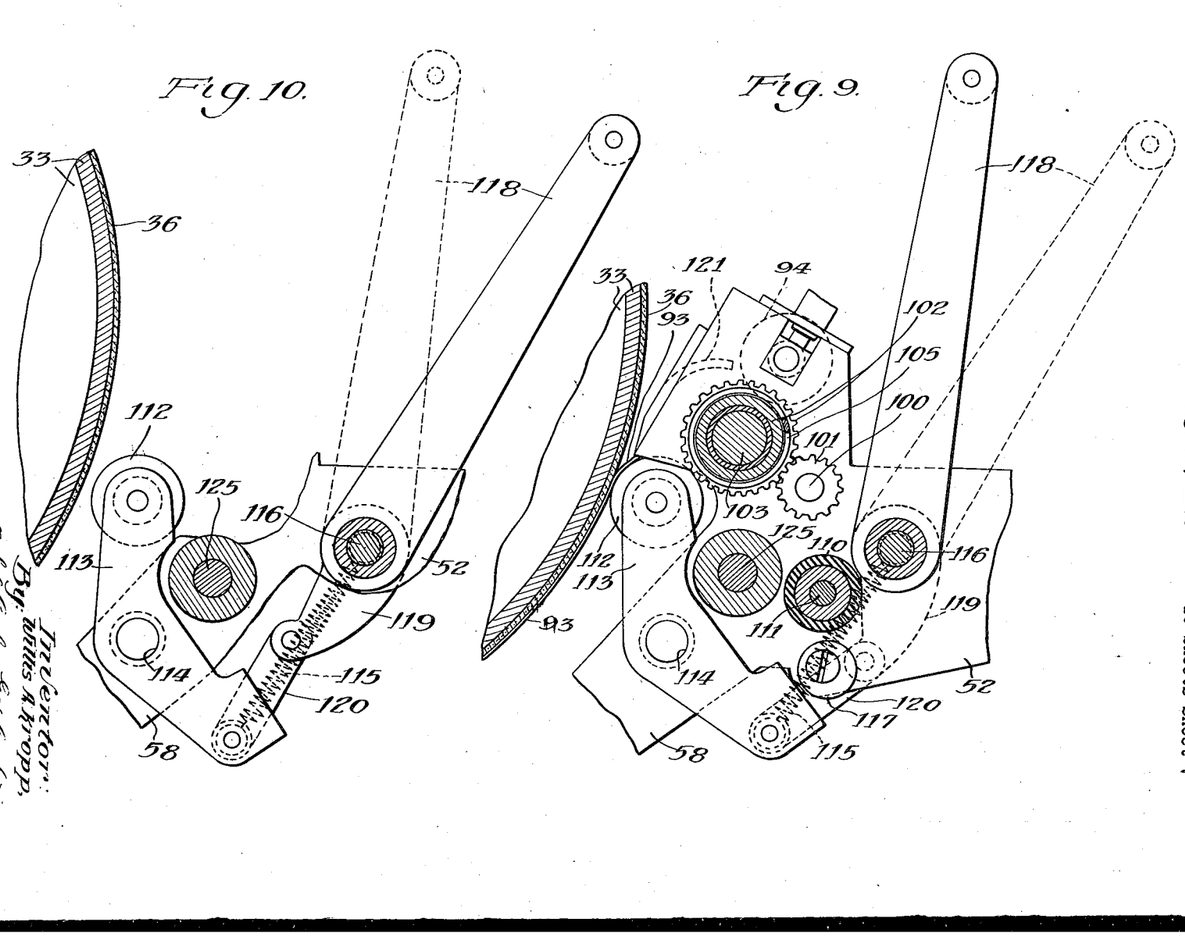
Fig. 9 is a vertical sectional view taken substantially at the line 9—9 of Fig. 8.
Fig. 10 is a view similar to Fig. 9 with certain of the parts omitted and showing a changed position of certain of the parts.

A short distance below the rollers 94 and 95 in advance of said rollers, I have provided a platen roller 112 which is rotatably mounted between two arms 113 which are pivotally mounted upon the framework by means of pivot pins 114, as is best shown in Figs. 9 and 10. Springs 115 connected at their lower ends with the lower ends of the arms 113 and at their upper ends with a rock shaft 116 hold the arms 113 normally turned to the limit of their motion in counterclockwise direction in Fig. 9 so as to hold the platen roller 112 in impression relationship to the drum 33 and the gelatin band 36 mounted thereon. For limiting the movement of the roller 112 toward the drum, I have provided eccentric devices 117 adjustably mounted in position upon the framework so as to be engaged by the lower end portions of the arms 113, as is clearly shown in said Fig. 9.

For moving the platen roller 112 toward the right from the position shown in Fig. 9 to the position as shown in Fig. 10 out of impression relationship with the drum, I have provided a lever 118 fixedly mounted upon the shaft 116. Depending from said rock shaft 116, there are two arms 119 which are flexibly connected by means of links 120 with the lower end portions of the arms 113, the arrangement being such that when the lever is swung from its solid line position as shown in Fig. 9 to its solid line position as shown in Fig. 10, the arms 113 are swung in clockwise directions about the pins 114 so as to carry the platen roller 112 out of impression relationship to the drum. This movement of the lever 118 carries the springs 115 into slightly past centers position with respect to the pivotal connection between the links 120 and the arms 119. The result is that the springs 115 are effective for holding the platen roller 112 against the drum in the position of the parts as shown in Fig. 9 and are effective alternatively for holding the platen roller in spaced relation to the drum as shown in Fig. 10.

In the description above, the springs 115 are described as holding the platen roller 112 in engagement with the drum. Such statement is correct with respect to the conditions when the segmental drum is in position to be engaged. When the drum has been rotated out of position to have its face portion engaged by the platen roller (see Fig. 11), the springs 115 then hold said roller in position for engagement with the drum when the drum in its rotation again reaches the position as shown in Fig. 12.

From a study of the parts as shown in Fig. 13, it will be appreciated that the line connecting the axis of the drum 33 with the axis of the roller 112 stands at approximately a right angle to the line connecting the axes of the rollers 94 and 95. As a result of this arrangement, the rollers 94 and 95 normally direct the sheet 93 approximately toward the center of the drum 33 rather than toward the point of contact between the drum and the platen roller. For diverting the sheet 93 as it is forwarded by the rollers 94 and 95 from the normal path toward the axis of the drum so as to cause the sheet to pass into the bite of the drum and the platen roller 112, I have provided a curved guide 121, as is clearly shown in Fig. 12, directly in the path of the advancing sheet arranged so that the sheet by following the contour of the guide is given the form of a loop, as is shown at 122 in said Fig. 12. The sheet advancing from the guide 121 passes into contact with the platen roller 112 and thence into engagement with a margin stop device 123 which is movably mounted in position a short distance in advance of the platen roller 112. The stop device 123 is in the form of a trough, being mounted in position adjacent to the platen roller 112 by means of arms 124 which are fixedly mounted upon a As is best shown in Figs. 14 and 15, the cam roller 152 is adjustable with respect to the bellcrank lever 148, being secured in position by means of a pin 153 which is slidably mounted in a slot 154 in the arm of the lever. The arrangement is such that the spring 150 normally holds the roller 152 in position for engagement with the cam 47, as shown in Fig. 14, the stripper bar roller 141 standing under such circumstances in such position as to enable the extending end portion of the copy sheet 93 to move to a point opposite the outer face of said stripper bar as indicated in said two figures.

In the normal operation of the machine, the stripper bar 141 is held in the position as shown in Fig. 14 until the copy sheet 93 stands opposite the face of said bar 141, when the cam 47 engages the roller 152 for rotating the shaft 143 in counterclockwise direction in said Fig. 14 against the action of the spring 150 for carrying the stripper bar 141 outwardly toward the left in said figure. Such movement of the stripper bar 141 forces the loose end portion of the copy sheet 93 into engagement with the rotating stripper roller 135 by reason of which the copy sheet is caused to move toward the left into the position as shown in Fig. 15. As the drum continues to rotate, the copy sheet is continued in its movement toward the left until it is completely stripped from the gelatin band 36 and delivered to the tray 137. For turning the end of the copy sheet 93 downwardly into the tray, I have provided a guide plate 155 which is secured between the frame standards 31 and 32 at their upper end portions as is clearly shown in Fig. 2. The arrangement is such that upon each succeeding rotation of the drum the leading edge of the copy sheet normally is stripped from the gelatin band in the manner described.

Figure 8:
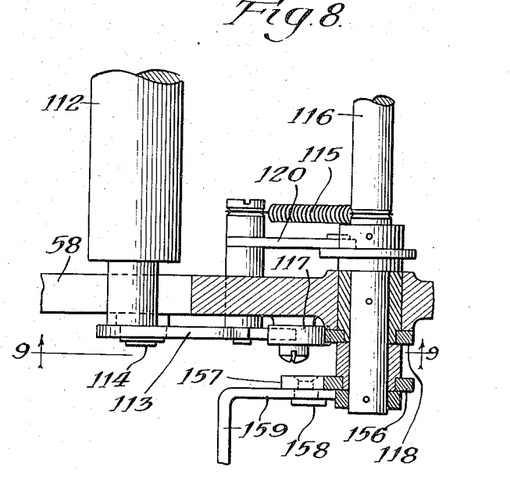

In my improved machine, I have provided means for throwing the stripper mechanism out of operation. This means comprises a lever 156 (see Fig. 2) mounted adjacent to the lever 118, such lever 156 in the arrangement shown being loosely mounted upon the rock shaft 116, as is best shown in Fig. 8. As is clearly shown in Fig. 3, the lever 156 is provided with a downward extension 157 below the rock shaft 116, such extension 157 being pivotally connected by means of a rivet 158 with the rear end portion of a link 159 which extends forwardly along the side of the machine as is best shown in Fig. 1. At its forward end, the link 159 is provided with a longitudinally extending slot 160 therein which is slidably mounted upon a pin 161 carried by the adjacent frame member 32 (see Figs. 14 and 15). As is clearly shown in Fig. 18, the link 159 is formed in two sections in order to provide a laterally extending arm 162 at an intermediate point along the link, such laterally extending arm 162 being provided at its end portion with a set-screw 163 adjustably mounted in position therein for operative engagement with the pin 149' carried by the bellcrank lever 148 as above described. The arrangement is such that when the lever 156 is moved in counterclockwise direction in Fig. 3, the link 159 is moved rearwardly for bringing the set-screw 163 into operative engagement with the pin 149' so as to swing the bell-crank lever 148 in counterclockwise direction in Fig. 14 for carrying the cam roller 152 out of engagement with the cam 47 and for carrying the stripper roller bar 141 from the position as shown in Fig. 14 to substantially the position as shown in Fig. 15. With the stripper bar 141 held in the position as shown in said Fig. 15, the drum 33 is enabled to carry a copy sheet 93 a plurality of times past the critical point at which the stripping operation normally takes place. As soon as the pressure upon the lever 156 is relaxed, the spring 150 serves to carry the cam roller 152 and the stripper bar 141 again into position for normal operation.

It is believed to be unnecessary to describe further in detail the operation of the machine or any of the parts. When the stripper mechanism is held out of operation by pressure upon the lever 156 as above described, feed rollers 88 and 89 are preferably swung upwardly and backwardly out of engagement with the pile of sheets so as to prevent the delivery of additional sheets to the drum while a sheet is being carried around for a repeated impression. The arrangement is such that all of the remaining operations can be carried out without bad effects during the time the stripper mechanism is thrown out of operation, such parts being adapted to run idly in the absence of additional copy sheets being fed to the drum.

By the use of my improved apparatus, I have been enabled to obtain very satisfactory results in the matter of the handling of the paper for rapid and accurate work.

While I prefer to employ the form and arrangement of parts as illustrated in the drawings and as above described, it is to be understood that my invention is not limited to the form and arrangement as shown except so far as the claims may be so limited, it being understood that changes might well be made in the form and arrangement of the parts without departing from the spirit of my invention.

I claim:

1. In a duplicating machine, the combination of two rotary members adapted to rotate in operative engagement with each other, means for rotating said rotary members, two rollers rotatably mounted adjacent to said rotary members also in cooperative relation to each other for forwarding a copy sheet to said first-named rotary members, means adapted by engagement with a sheet being forwarded from said rollers to said first-named rotary members to provide an excessive length of sheet portion intervening so as to enable said first-named rotary members to acquire an effective grip on the sheet while taking up the slack, and means for applying power to said rollers intermittently during the rotation of said first-named rotary members for forwarding a sheet to said first-named rotary members.

2. In a duplicating machine, the combination of two rotary members adapted to rotate in operative engagement with each other, means for rotating said rotary members, two rollers rotatably mounted adjacent to said rotary members also in cooperative relation to each other for forwarding a copy sheet and arranged so that their line of centers stands at a substantial angle to the line of centers of said first-named rotary members, guiding means for directing the copy sheet into the form of a bowed loop in passing from said rollers to said first-named rotary members, and means for applying power to said rollers intermittently during the rotation of said first-named rotary members for forwarding a sheet to said first-named rotary members.

3. In a duplicating machine, the combination of two rotary members adapted to rotate in operative engagement with each other, means for rotating said rotary members, two rollers rotatably mounted adjacent to said rotary members also in cooperative relation to each other for forwarding a copy sheet and arranged so that their line of centers stands at a substantial angle to the line of centers of said first-named rotary members, means comprising a curved plate in position to be engaged by a sheet forwarded by said two rollers and shaped to deflect the sheet from its normal path in the form of a bowed loop extending to said first-named two rotary members, and means for applying power to said two rollers intermittently during the rotation of said first-named rotary members for forwarding a sheet to said rotary members and arranged to stop the rotation of said rollers when the leading portion of said sheet ahead of said loop stands in position to be gripped by said rotary members.

4. In a duplicating machine, the combination of a segmental drum, means for rotating said drum, a platen roller rotatably mounted adjacent to said drum so as to be rotated by the drum when in operative engagement therewith, two rollers rotatably mounted adjacent to said drum also in cooperative relation to each other for forwarding a copy sheet toward the drum, a curved guide in position to be engaged by said sheet for deflecting it into substantially tangential position between the drum and the platen so as to provide a loop in the sheet, a margin stop member normally held yieldingly in position to engage the forward edge of a sheet extending a short distance past said platen roller, means for driving said two rollers for forwarding a copy sheet past said platen roller to said stop member just prior to the operative engagement of said segmental drum with said platen roller, and means for withdrawing said stop member from the path of said sheet for preventing contact of the stop member with the face portion of the drum.

5. In a duplicating machine, the combination of a segmental drum, means for rotating said drum, a platen roller rotatably mounted adjacent to said drum so as to be rotated by the drum when in operative engagement therewith, two rollers rotatably mounted adjacent to said drum also in cooperative relation to each other for forwarding a copy sheet to the drum and platen roller, a margin stop member normally held yieldingly in position to engage the forward edge of a sheet extending a short distance past said platen roller, an arm movably mounted adjacent to said drum, means actuated by an operative stroke of said arm for driving said two rollers in the direction for forwarding a sheet past said platen to said stop member, means rotating with the drum for giving said arm an operative stroke for advancing said sheet just prior to the operative engagement of said segmental drum with said platen roller, and means for withdrawing said stop member from the path of said sheet for preventing contact of the stop member with the face portion of the drum.

6. In a duplicating machine, the combination of two rotary members adapted to rotate in operative engagement with each other, means for rotating said rotary members, two rollers rotatably mounted adjacent to said rotary members also in cooperative relation to each other for forwarding a copy sheet to said first-named rotary members, means adapted by engagement with a sheet being forwarded by said rollers to said first-named rotary members to provide an excessive length of sheet portion interposed so as to enable said first-named rotary members to acquire an effective grip on the sheet while taking up the slack, and means for applying power to said rollers intermittently during the rotation of said first-named rotary members, comprising an arm movably mounted adjacent to said first-named rotary members, means actuated by an operative movement of said arm for driving said two rollers in the direction for forwarding a sheet to said first-named rotary members, and means adapted at timed intervals during the rotation of said first-named rotary members to give said arm an operative stroke for advancing the leading edge of a copy sheet from a position between said two rollers to a position between said first-named rotary members.

7. In a duplicating machine, the combination of a segmental drum, means for rotating said drum, a platen roller rotatably mounted adjacent to said drum so as to be rotated by the drum when in operative engagement therewith, two rollers rotatably mounted adjacent to said drum also in cooperative relation to each other for forwarding a copy sheet to the drum and platen roller, means adapted by engagement with a sheet being forwarded by said rollers to provide an excessive length of sheet portion intervening between said two rollers and the platen roller so as to enable said drum and platen roller to acquire an effective grip on the sheet while taking up the slack, and means for applying power to said two rollers during a portion of each successive rotation of the drum for forwarding a sheet to the drum.

8. In a duplicating machine, the combination of two rotary members adapted to rotate in operative engagement with each other, means for rotating said rotary members, two rollers rotatably mounted adjacent to said rotary members also in cooperative relation to each other for forwarding a copy sheet to said first-named rotary members, means adapted by engagement with a sheet being forwarded from said rollers to said first-named rotary members to provide an excessive length of sheet portion intervening so as to enable said first-named rotary members to acquire an effective grip on the sheet while taking up the slack, a margin stop member normally held yieldingly in position to engage the forward edge of a sheet extending past said two rollers for assisting in holding said sheet in its looped formation, means for driving said two rollers for forwarding a copy sheet past said rotary members into engagement with said stop device at timed intervals during the rotation of said rotary members, and means for withdrawing said stop member from the path of said sheet promptly following the formation of said loop.

9. In a duplicating machine, the combination of a segmental drum, means for rotating said drum, a platen roller rotatably mounted adjacent to said drum so as to be rotated by the drum when in operative engagement therewith, two rollers mounted adjacent to said drum also in cooperative relation to each other for forwarding a copy sheet to the drum and platen roller, means adapted by engagement with a sheet being forwarded from said two rollers to said drum and platen roller to provide an excessive length of sheet portion intervening so as to enable said drum and platen roller to acquire an effective grip on the sheet while taking up the slack, a margin stop member normally held yieldingly in position to engage the forward edge of a sheet extending a short distance past said platen roller for assisting in holding said sheet in its looped formation, means for driving said rollers for forwarding a copy sheet past said platen roller into engagement with said stop device at timed intervals during the rotation of said drum, and means for withdrawing said stop member from the path of said sheet promptly following the formation of said loop.

10. In a duplicating machine, the combination of a drum, means for rotating said drum, to rollers rotatably mounted adjacent to said drum in cooperative relation to each other for forwarding a copy sheet to said drum, a platen roller rotatably mounted in position to press a copy sheet into operative engagement with the drum, means for applying power to said two rollers during a portion of each successive rotation of the drum for rotating said two rollers in the direction for forwarding a sheet to the drum, and means comprising a spring movable past centers for holding said platen roller in operative engagement with said drum or alternatively in spaced relation to the drum.

11. In a duplicating machine, the combination of a segmental drum, means for rotating said drum, an arm swingingly mounted adjacent to said drum, a platen roller rotatably mounted on said arm so as to be rotated by the drum when in operative engagement therewith, two rollers rotatably mounted adjacent to said drum in cooperative relation to each other for forwarding a copy sheet to the drum and the platen roller, means for driving said two rollers during a portion of each rotation of the drum, and means comprising a spring connected with said arm and movable past centers for holding said platen roller in operative engagement with said drum or alternatively in spaced relation to the drum.

12. In a duplicating machine, the combination of a segmental drum, means for rotating said drum, a platen roller rotatably mounted adjacent to said drum so as to be rotated by the drum when in operative engagement therewith, two rollers rotatably mounted adjacent to said drum also in cooperative relation to each other for forwarding a copy sheet to the drum and platen roller, means adapted by engagement with a sheet being forwarded by said rollers to provide an excessive length of sheet portion intervening between said two rollers and the platen roller so as to enable said drum and platen roller to acquire an effective grip on the sheet while taking up the slack, means for applying power to said two rollers during a portion of each successive rotation of the drum for forwarding a sheet to the drum, and means comprising a spring movable past centers for holding said platen roller in operative engagement with said drum or alternatively in spaced relation to the drum.

13. In a duplicating machine, the combination of a drum, means for rotating said drum, a table adjacent to said drum, a shaft rotatably mounted in horizontal position above said table, an arm swingingly mounted on said shaft and extending therefrom above said table in spaced relation thereto, a roller rotatably mounted on said arm so as to engage successive top sheets of a pile of sheets on said table, means for driving said roller from said shaft arranged to permit the arm to move upwardly and downwardly without interfering with the drive of the roller, means for driving said shaft in one direction for causing the roller to move a sheet edgewise from the pile but adapted upon actuation in the opposite direction to permit the roller to remain stationary, a pinion on said shaft, a second arm pivotally mounted on said table having gear teeth on its upper end engaging said pinion, a bellcrank lever pivotally mounted below said table, means rotating with said drum adapted upon each rotation of the drum to give said bellcrank lever a quick operative stroke, and connections between said bellcrank lever and said second arm adapted upon an operative stroke of said bellcrank lever to swing said second arm for rotating said roller in the direction for moving the topmost sheet of said pile toward said drum and arranged so that when the application of power by said bellcrank lever ceases said connections cause said second arm to swing in the opposite direction into normal operative position with respect to the shaft and roller ready for forwarding another sheet from said pile.

14. In a duplicating machine, the combination of a segmental drum, means for mounting a gelatin member on said drum, means for applying a copy sheet to said gelatin member with an end portion extending beyond said member, a stripping roller rotatably mounted in adjustable eccentric mounting means in slightly spaced relation to said drum so as to be movable toward and from the drum, a second roller rotatably mounted in position substantially opposite the inner face of said stripping roller and movable bodily toward said stripping roller, and means for moving said second roller outwardly in such timed relation to the rotation of the drum as to carry the loose extending end portion of said copy sheet into firm engagement with said stripping roller for removing the copy sheet from engagement with said gelatin member.

15. In a duplicating machine, the combination of a segmental drum, means for mounting a gelatin member on said drum, means for applying a copy sheet to said gelatin member with an end portion extending beyond said member, a stripping roller rotatably mounted in slightly spaced relation to said drum at one side thereof, a rock shaft rotatably mounted in eccentric bearings adjustably mounted in position, arms mounted on said rock shaft opposite to each other, a second roller rotatably mounted between said arms in position substantially opposite the inner face of said stripping roller for carrying the loose extending end portion of said copy sheet into firm engagement with said stripping roller for removing the copy sheet from engagement with said gelatin member, a third arm fixedly mounted on said shaft, a roller rotatably mounted on said third arm, and a cam rotating with said drum adapted by engagement with said last-named roller to move said second roller outwardly in timed relation for engaging said copy sheet with said stripping roller.

WILLIS A. KROPP.